(12) United States Patent
Horan et al.

(10) Patent No.: US 11,131,581 B2
(45) Date of Patent: Sep. 28, 2021

(54) OPTICAL ASSEMBLY AND METHOD OF MANUFACTURING AN OPTICAL ASSEMBLY

(71) Applicant: BCS Automotive Interface Solutions GmbH, Radolfzell (DE)

(72) Inventors: Laura Horan, Radolfzell (DE); Ulrich Backes, Radolfzell (DE)

(73) Assignee: BCS Automotive Interface Solutions GmbH, Radolfzell (DE)

( * ) Notice: Subject to any disclaimer, the term of this patent is extended or adjusted under 35 U.S.C. 154(b) by 172 days.

(21) Appl. No.: 16/535,769

(22) Filed: Aug. 8, 2019

(65) Prior Publication Data

US 2020/0049551 A1 Feb. 13, 2020

(30) Foreign Application Priority Data

Aug. 9, 2018 (DE) .................... 10 2018 119 412.9

(51) Int. Cl.
| | | |
|---|---|---|
| *G01J 1/08* | (2006.01) | |
| *F21V 5/04* | (2006.01) | |
| *G01J 1/04* | (2006.01) | |
| *G02B 3/08* | (2006.01) | |

(52) U.S. Cl.
CPC ................ *G01J 1/08* (2013.01); *F21V 5/045* (2013.01); *G01J 1/0411* (2013.01); *G02B 3/08* (2013.01)

(58) Field of Classification Search
CPC .. G01J 1/08; G01J 1/0411; G02B 3/08; G02B 3/0081; G02B 3/02; G02B 2003/0093; F21V 5/045; F21V 5/04; B60S 1/0833; B60S 1/0837; B60S 1/084
See application file for complete search history.

(56) References Cited

U.S. PATENT DOCUMENTS

| | | | | |
|---|---|---|---|---|
| 4,510,560 A | * | 4/1985 | Negishi | ..................... F21V 7/00 362/296.09 |
| 5,617,163 A | * | 4/1997 | Ohtake | .................. G03B 15/05 362/16 |
| 5,811,793 A | * | 9/1998 | Pientka | ................. B60S 1/0837 250/227.25 |
| 5,838,454 A | * | 11/1998 | Pientka | ................. B60S 1/0822 356/445 |
| 5,839,823 A | * | 11/1998 | Hou | .................. G02F 1/133605 362/327 |
| 5,898,183 A | * | 4/1999 | Teder | .................... B60S 1/0837 250/574 |
| 6,064,059 A | * | 5/2000 | Pientka | ................. B60S 1/0822 250/227.24 |
| 7,751,054 B2 | * | 7/2010 | Backes | ................. B60S 1/0837 356/445 |

(Continued)

FOREIGN PATENT DOCUMENTS

| | | |
|---|---|---|
| WO | 2009015988 A1 | 2/2009 |
| WO | 2015140181 A1 | 9/2015 |

*Primary Examiner* — John R Lee
(74) *Attorney, Agent, or Firm* — Faegre Drinker Biddle & Reath LLP

(57) ABSTRACT

An optical assembly for an optical sensor device has a lens plate, a light source, and a light receiving unit. The lens plate includes a lens structure on a side associated with the light source and a light extraction structure on a side facing away from the light source. The lens structure has different local radii of curvature.

10 Claims, 2 Drawing Sheets

(56) References Cited

U.S. PATENT DOCUMENTS

| | | | | |
|---|---|---|---|---|
| 7,804,055 B2* | 9/2010 | Backes | | B60S 1/0822 250/227.25 |
| 7,847,255 B2* | 12/2010 | Teder | | B60S 1/0822 250/341.8 |
| 8,082,783 B2* | 12/2011 | Backes | | B60S 1/0837 73/170.17 |
| 8,269,202 B2* | 9/2012 | Backes | | B60S 1/0837 250/573 |
| 9,546,900 B2* | 1/2017 | Backes | | B60S 1/0833 |
| 10,207,680 B2* | 2/2019 | Backes | | G02B 27/0927 |
| 2002/0094495 A1* | 7/2002 | Ono | | G02B 3/08 430/321 |
| 2007/0235638 A1* | 10/2007 | Backes | | B60S 1/0837 250/227.24 |
| 2008/0116379 A1* | 5/2008 | Teder | | B60S 1/0822 250/341.1 |
| 2008/0297803 A1* | 12/2008 | Backes | | B60S 1/0837 356/445 |
| 2009/0032689 A1* | 2/2009 | Backes | | B60S 1/0837 250/227.24 |
| 2009/0261237 A1* | 10/2009 | Backes | | B60S 1/0837 250/227.11 |
| 2009/0284735 A1* | 11/2009 | Backers | | G01J 1/4204 356/73 |
| 2010/0147067 A1* | 6/2010 | Backes | | G01N 21/552 73/170.17 |
| 2011/0164329 A1* | 7/2011 | Jiang | | G02B 1/10 359/742 |
| 2012/0227796 A1* | 9/2012 | Dougherty | | H01L 31/0543 136/255 |
| 2012/0267514 A1* | 10/2012 | Backes | | G02B 5/045 250/208.2 |
| 2013/0240739 A1* | 9/2013 | Shpater | | G02B 3/0043 250/353 |
| 2017/0182978 A1* | 6/2017 | Backes | | B60S 1/0837 |
| 2017/0291582 A1* | 10/2017 | Park | | G01J 1/0414 |
| 2017/0292682 A1* | 10/2017 | Sepkhanov | | G02B 27/30 |
| 2018/0074325 A1* | 3/2018 | Wheelwright | | G02B 27/0176 |
| 2019/0353591 A1* | 11/2019 | Backes | | G01N 21/552 |
| 2020/0001773 A1* | 1/2020 | Backes | | G02B 19/0076 |
| 2020/0049551 A1* | 2/2020 | Horan | | G01J 1/0204 |
| 2020/0249081 A1* | 8/2020 | Backes | | G01J 1/0407 |

* cited by examiner

OPTICAL ASSEMBLY AND METHOD OF MANUFACTURING AN OPTICAL ASSEMBLY

CROSS-REFERENCE TO RELATED APPLICATION

This application claims priority to German Application No. DE 10 2018 119 412.9, filed 9 Aug. 2018, which is herein incorporated by reference in its entirety.

TECHNICAL FIELD

This disclosure relates to an optical assembly for an optical sensor device, and in particular for an optical sensor device of a motor vehicle, and to a method of manufacturing an optical assembly.

BACKGROUND

Optical sensor devices are employed in motor vehicles, for example as rain sensors that detect a wetting of a windshield.

Such rain sensors typically include a light source, a lens plate fastened to the windshield, and a light receiver. The lens plate typically has a lens structure on a side associated with the light source and a light extraction structure on a side facing away from the light source.

Light emitted by the light source is injected or coupled into the lens plate by means of the lens structure, with the light rays running substantially parallel within the lens plate. The light extraction structure then deflects the light rays by approx. 45 degrees towards a measurement region on the windshield. When the pane is dry, the light rays are totally reflected there, whereas when the pane is wet, some of the light rays exit the pane. The change in light intensity of the reflected light therefore allows a wetting of the windshield to be detected.

In lens plates known from the prior art, however, the sensitivity for light extraction is not uniform in the measurement region, but typically has the shape of a Gaussian distribution (that is, a distinct maximum in the center and strongly decreasing towards the edges). A wetting at the edge of the measurement region thus results in a significantly lower drop in the light intensity of the reflected light than a wetting of a central portion of the measurement region and is therefore more difficult to detect. Consequently, a wetting of the windshield cannot be reliably detected throughout the entire measurement region.

It is therefore an object of the disclosure to provide an optical assembly and a method of manufacturing in which the disadvantages of the prior art are reduced.

SUMMARY

Embodiments of the disclosure include an optical assembly for an optical sensor device, in particular for an optical sensor device of a motor vehicle, including a lens plate, a light source, and a light receiving unit, wherein the lens plate includes a lens structure on a side associated with the light source and a light extraction structure on a side facing away from the light source, the lens structure having different local radii of curvature.

In this context and in the following, "local" should be understood to mean "in a predefined environment of a point". Therefore, "different local radii of curvature" thus means that the curvature of the lens structure may well be constant in sections, but changes across the lens structure.

In embodiments, the local radii of curvature are selected such that a predefined distribution of light exiting through the light extraction structure is achieved, in particular in a measurement region associated with the optical assembly.

Here, the distribution of the light is such that a change of intensity received at the light receiving unit is only dependent on a total area on which light rays generated by the light source and exiting through the light extraction structure are extracted in the measurement region.

The intensity change detected at the light receiving unit is thus not dependent on the location of the extraction of light rays in the measurement region. The light receiving unit is therefore equally sensitive to an extraction of light rays in the entire measurement region.

Accordingly, the entire measurement region (that is, in particular also its border regions) can be made use of for measurements, in particular for the detection of a wetting of a windshield of the motor vehicle. In particular, a wetting of the windshield can thus be reliably detected in this way throughout the measurement region (including the border regions thereof).

The surface of the lens structure thus exhibits a varying curvature. If the curvature were substantially constant, a transmission angle of light rays (measured counter to an axial direction of the lens plate) which, emanating from the light source, impinge on the lens structure and enter the lens plate, would indeed change due to spherical aberration, but only insignificantly. Owing to a variable curvature of the lens plate, the shape of the lens structure and, hence, a local angle of incidence of the light rays on the lens structure is changed such that the transmission angle of the light rays is dependent on the place of incidence on the lens structure, which results in a changed intensity distribution in the lens plate and also in the measurement region.

Embodiments of the disclosure are based on the fundamental idea that not only light rays running parallel to one another along the axial direction in the lens plate reach the measurement region, but rather, that the light extraction structure has an acceptance angle range in which light rays running through the lens plate still reach the measurement region after exiting the light extraction structure. Changing the local curvature of the lens structure will change the local transmission angle of the lens structure. The local curvature of the lens structure is selected here such that, for one thing, as many light rays as possible are located within the acceptance angle range of the light extraction structure, so that as high a light yield as possible is achieved, and, for another thing, the light receiving unit can uniformly detect an extraction of light throughout the entire measurement region, that is, a uniform distribution of the useful light in the measurement region is achieved.

In embodiments, the different local radii of curvature are thus selected such that light exiting through the light extraction structure is, at least in a measurement region associated with the optical assembly, distributed such that when light rays are coupled out in the measurement region, an intensity change received at the light receiving unit is only dependent on a total area on which the light rays are extracted in the measurement region.

One aspect provides that the lens structure constitutes a Fresnel lens. In particular, as described above, local radii of curvature of grooves of the Fresnel lens are selected such that when light is extracted in the measurement region, an intensity change received at the light receiving unit is only dependent on the total area on which the light rays are extracted in the measurement region. Compared to a conventional lens structure, the configuration of the lens structure as a Fresnel lens allows an especially compact design of the optical assembly.

According to a further aspect, a local radius of curvature of the lens structure is described in sections by a linear function or by a non-linear function. The linear or non-linear function indicates the local curvature of the lens structure as a function of the horizontal distance from a predefined point of the lens structure, for example from a center of the lens structure. Accordingly, starting from the predefined point, the curvature of the lens structure and, hence, the local transmission angle changes linearly or non-linearly. This means that by selecting the function, the local transmission angles can be adapted such that when light is extracted in the measurement region, an intensity change received at the light receiving unit is only dependent on the total area on which the light rays are extracted in the measurement region. In addition, by selecting the function, the transmission angles can be adapted such that as many light rays as possible are within the acceptance angle range of the light extraction structure.

In embodiments, the function is monotonic, in particular strictly monotonic. Accordingly, the transmission angle likewise changes monotonically, in particular strictly monotonically. For example, the function is (strictly) monotonically decreasing, so that the transmission angle increases (strictly) monotonically.

Also, embodiments provide that at least one groove of the Fresnel lens is described by the function. The linear or non-linear function thus indicates the local curvature of the groove of the Fresnel lens as a function of the horizontal distance from a predefined point of the lens structure, for example from a starting point of the groove (i.e. from that point of the groove that is closest to the center of the Fresnel lens).

A plurality of grooves of the Fresnel lens may each be described by the same function or by different functions. This means that, more particularly, a function is involved that is defined in sections.

According to a different aspect, the light source is arranged in a focal point of the lens structure. In this way, the luminous efficiency of the optical assembly is improved. The focal point here is understood to mean in particular that point which would be the focal point in the case of a constant curvature of the lens structure.

In embodiments, the lens structure includes anti-transmission features in some areas. More particularly, the anti-transmission features are configured to prevent the light rays coming from the light source from entering the lens plate or at least to attenuate the light intensity. The anti-transmission features are, for example, formed by an absorbing coating of the lens structure. In embodiments, the anti-transmission features are arranged such that a central maximum intensity in the measurement region is attenuated. In connection with the lens structure design according to the invention with regard to the local radii of curvature, a particularly homogeneous sensitivity of the light receiving unit with respect to light extraction in the measurement region is obtained.

In accordance with a further aspect, individual grooves of the Fresnel lens are provided with anti-transmission features. More specifically, the anti-transmission features are configured to prevent the light rays coming from the light source from entering the lens plate through individual grooves of the Fresnel lens, or at least to attenuate the light intensity. The anti-transmission features are formed, for instance, by an absorbing coating of individual grooves of the Fresnel lens. In embodiments, the anti-transmission features are arranged such that a central maximum intensity in the measurement region is attenuated. In connection with the lens structure design according to the invention with regard to the local radii of curvature, a particularly homogeneous sensitivity of the light receiving unit with respect to light extraction in the measurement region is obtained.

Also, embodiments of the disclosure include a method of manufacturing an optical assembly, in particular an optical assembly as described above, which includes a lens plate, a light source, and a light receiving unit, wherein the lens plate includes a lens structure on a side associated with the light source and a light extraction structure on a side facing away from the light source, comprising the steps of:

specifying a focal length and a transmission function of the lens structure; and determining a curvature function that describes the local curvature of the lens structure;

wherein the curvature function is such that a power density of light coming from a focal point of the lens structure and passing through the lens structure corresponds to the specified transmission function.

In particular, the above-described optical assembly can be obtained by the method of manufacturing an optical assembly.

The transmission function thus describes an intensity of the light entering the lens plate through the lens structure, in particular as a function of a horizontal distance from a predefined point of the lens structure, for example from a center of the lens structure, or, if the lens structure is in the form of a Fresnel lens, from a starting point of a groove of the Fresnel lens. Expressed in the terminology of geometrical optics, this means that light rays which, starting from the light source, impinge on the lens structure are each assigned a transmission angle which is such that a desired distribution of the light generated by the light source is obtained in the lens plate, in particular a desired intensity distribution (i.e. the desired power density) of the useful light component. In particular, the light rays do not run parallel in the lens plate here.

The transmission function here may depend on a plurality of parameters of the optical assembly and/or of the sensor device. The parameters include, for example, one or more of the following variables: Distance between the light source and the light receiving unit (measured in the transverse direction of the lens plate), thickness of the lens plate (measured in the axial direction of the lens plate), thickness of a (windshield) pane (measured in the axial direction), thickness of a coupling structure (measured in the axial direction), refractive index of the lens plate, refractive index of the coupling structure, refractive index of the (windshield) pane and/or acceptance angle range of the light extraction structure.

In embodiments, the transmission function is such that when light is extracted in the measurement region, an intensity change received at the light receiving unit is only dependent on the total area on which the light rays are extracted in the measurement region. With regard to the advantages, reference is made to the foregoing discussions.

BRIEF DESCRIPTION OF THE DRAWINGS

Further advantages and characteristics will be apparent from the description below and the drawings, to which reference is made and in which.

DETAILED DESCRIPTION

Figure 1:
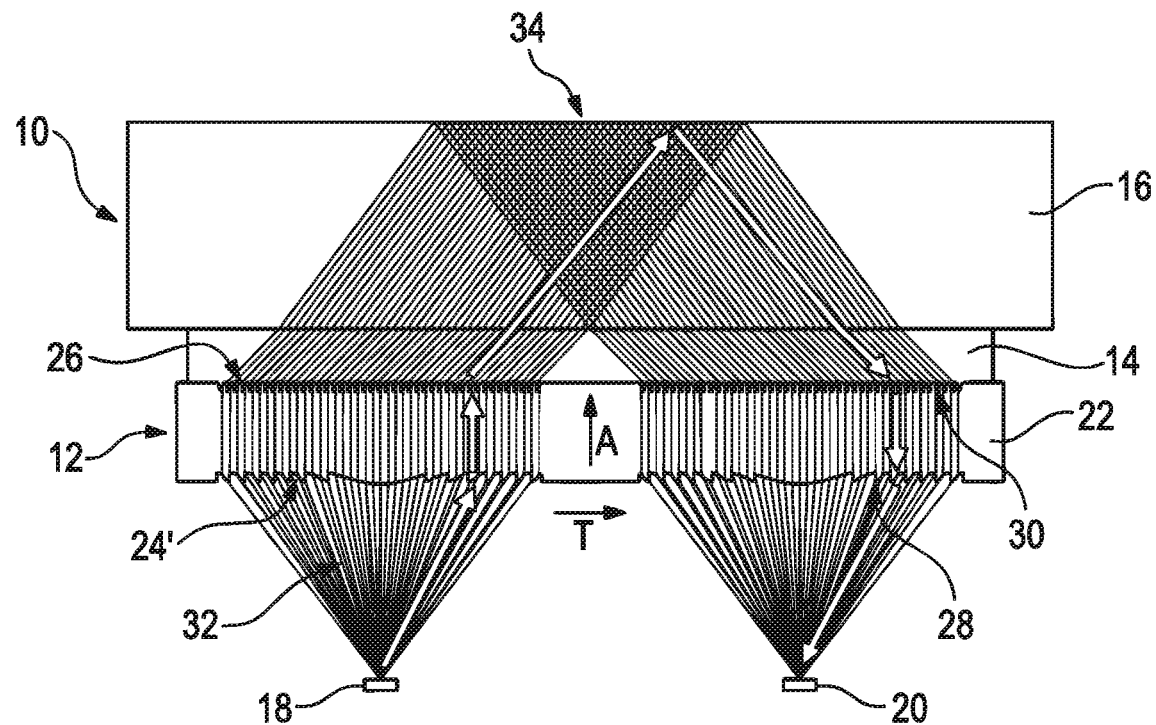
FIG. 1 shows a cross section taken through a rain sensor with an optical assembly from the prior art.

FIG. 1 shows a sensor device 10 from the prior art, which, in the variant shown here, is in the form of a rain sensor for a motor vehicle.

The sensor device 10 comprises an optical assembly 12 which, by means of a coupling layer 14, is mounted to a pane 16 which more particularly is a windshield of the motor vehicle. The coupling layer 14 here preferably has a refractive index similar to that of the pane 16.

The optical assembly 12 comprises a light source 18, a light receiving unit 20 and a lens plate 22.

The lens plate 22 includes a first lens structure 24' on the light source side, which is provided on a side of the lens plate 22 associated with the light source 18. Furthermore, the lens plate 22 comprises a light extraction structure 26 on the light source side, which is provided on a side of the lens plate 22 associated with the pane 16.

The light source 18 can be arranged in a focal point of the first lens structure 24' here.

In addition, in the variant shown, the lens plate 22 includes a second lens structure 28 on the light receiver side, which is provided on a side of the lens plate 22 associated with the light receiving unit 20.

The lens plate 22 further comprises a light injection structure 30 on the light receiver side, which is provided on a side of the lens plate 22 associated with the pane 16.

The light receiving unit 20 can be arranged in a focal point of the second lens structure 28.

In the variant shown in FIG. 1, the two lens structures 24', 28 are each formed as a Fresnel lens, while the light extraction structure 26 and the light injection structure 30 are each configured as a Fresnel prism. However, the lens structures 24', 28, the light extraction structure 26, and the light injection structure 30 may also each have any other suitable shape.

The mode of operation of the sensor device 10 shown in FIG. 1 is set forth below.

The light source 18 emits light rays 32 which are refracted by the first lens structure 24' in such a way that within the lens plate 22, they run substantially parallel along an axial direction A of the lens plate 22. In other words, the first lens structure 24' thus has a substantially constant curvature.

The light extraction structure 26 deflects the light rays 32 by about 45 degrees towards a measurement region 34, associated with the sensor device 10, on the pane 16.

When the pane is dry (that is, not wetted), the light rays 32 are totally reflected at the transition from the pane 16 to the environment, injected back into the lens plate 22 by means of the light injection structure 30, and focused on the light receiving unit 20 by means of the second lens structure 28.

When the pane 16 is wetted, on the other hand, no total reflection occurs in the wetted areas due to the smaller difference between the refractive indices of the pane 16 and water, which is why at least some of the light rays 32 exit the pane 16. A light intensity of the light rays 32 which reach the light receiving unit 20 is therefore reduced and the wetting of the pane 16 can therefore be detected.

In the variant of the sensor device 10 shown in FIG. 1, the power density of the light rays in the measurement region 34 typically exhibits substantially the shape of a Gaussian distribution. In the center of the measurement region 34, the light intensity thus is high, whereas it decreases strongly towards the edges of the measurement region 34. The sensitivity with which the light receiving unit 20 receives light rays from the measurement region 34 also typically has substantially the shape of a Gaussian distribution. The detection sensitivity with which a light extraction can be determined on the measurement region 34 thus essentially follows a multiplication of two Gaussian functions. Because of the strong sensitivity exaggeration produced in the center and the strong drop at the edge, not the entire measurement region 34 can be utilized for detecting a wetting of the pane 16. Moreover, due to the difference in sensitivity, it cannot be reliably established how large the area of any light extraction was, i.e. the size of a water drop on the measurement region 34 cannot be determined with certainty.

Figure 2:
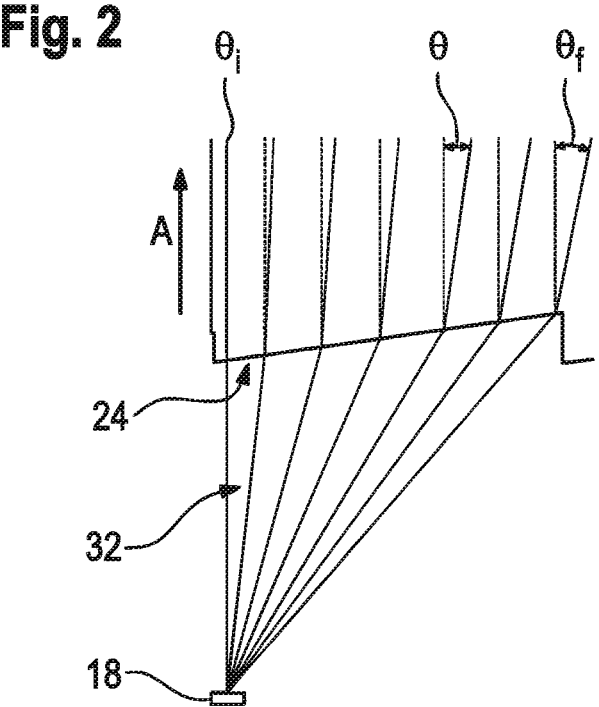
FIG. 2 shows a detail view of a portion of an optical assembly according to embodiments of the disclosure.

This problem is solved by a change in the design of the first lens structure 24, as is shown by way of example in FIG. 2. The purpose of the alteration is to change the power density of the light rays on the measurement region 34 in such a way that the multiplication of the power density in the measurement region 34 with the sensitivity distribution of the light receiving unit 20 results in a substantially constant profile.

As a result, a change in intensity received at the light receiving unit 20 when light is extracted in the measurement region 34 is only dependent on the total area on which the light rays are extracted in the measurement region 34 (for example because of a wetting of the pane 16).

The first lens structure 24 shown in FIG. 2 differs from the variant shown in FIG. 1 in that a local curvature of the first lens structure 24 is not constant, but rather location-dependent. In other words, the local curvature of the first lens structure 24 is a function of the horizontal distance (measured along a transverse direction T of the first lens structure 24) from a predefined point, for example from a center of the first lens structure 24 or from a starting point of a groove.

The result is that not all of the light rays 32 emitted by the light source 18 and entering the lens plate 22 through the first lens structure 24 run parallel to the axial direction A in the lens plate 22, but rather include a transmission angle θ with the axial direction A depending on the local curvature of the first lens structure 24.

The shape of the first lens structure 24 is adapted by means of the method described below with reference to FIGS. 1 to 3 in such a way that, when light is extracted in the measurement region 34, a change in intensity received at the light receiving unit 20 is only dependent on the total area on which the light rays are extracted in the measurement region 34 (for example because of a wetting of the pane 16).

First, a desired focal length and a desired transmission function of the first lens structure 24 are specified (step S1).

The light source 18 is provided spaced away from the first lens structure 24 by the desired focal length in the axial direction A, in particular opposite a center of the first lens structure 24.

The transmission function describes an intensity of the light that enters the lens plate 22 through the first lens structure 24, in particular as a function of a horizontal distance from a predefined point of the first lens structure 24 (measured in the transverse direction T), for example from the center of the first lens structure 24 or, as described in the following example, from a starting point of a groove of the first lens structure 24 formed as a Fresnel lens.

The surface of the first lens structure 24 is adapted at the starting point of a groove of the first lens structure 24 in such a way that the refracted light ray runs along the axial direction A in the lens plate 22 (step S2). The transmitted light ray thus includes a transmission angle of $\theta_i=0$ degrees with the axial direction A. The starting point of a groove here is understood to mean a center of the first lens structure 24 or that point of the groove which is closest to the center.

Proceeding from the starting point, the surface of the first lens structure 24 is now adapted such that the transmission angle θ increases monotonically in the transverse direction T, in particular strictly monotonically (step S3). In other words, the surface of the first lens structure 24 thus has a curvature that changes along the transverse direction T. In the case of a substantially constant curvature, the transmission angle θ would indeed change due to spherical aberration, but only insignificantly.

This means that a local curvature of the first lens structure 24 is a monotonic function of the horizontal distance (measured in the transverse direction T) from the starting point of the groove, in particular a strictly monotonic function. This function is ascertained in step S3.

The transmission angle $\theta_f$ is therefore largest at an end point of the groove, i.e. at that point of the groove which is farthest from the center of the first lens structure 24.

In embodiments, all angles between and including $\theta_i$ and $\theta_f$ are within an acceptance angle range of the light extraction structure 26, so that as high a luminous efficiency as possible is ensured. The acceptance angle range here is understood to mean the angular range (measured counter to the axial direction A) in which light rays passing through the lens plate 22 are refracted by the light extraction structure 26 toward the measurement region 34 and also reach the latter.

Figure 3:
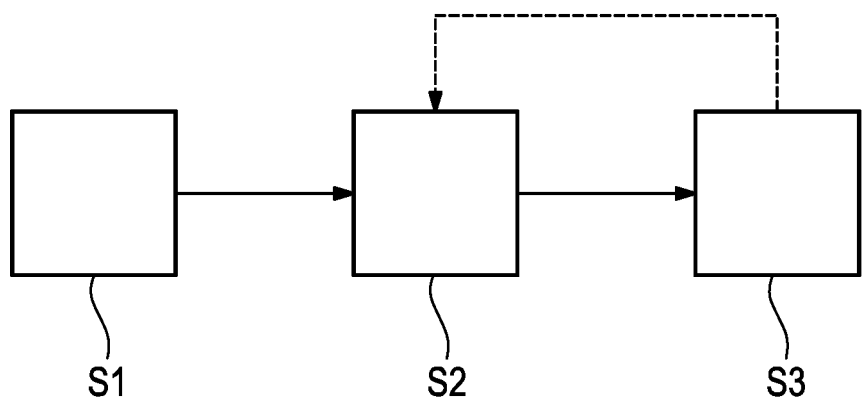
FIG. 3 shows a schematic flow chart of the steps of a method according to embodiments of the disclosure.

Steps S2 and S3 can now be repeated for further grooves of the first lens structure 24 (indicated by the dashed arrow in FIG. 3). The local curvature of the individual grooves may be described here by the same or by different functions.

The shape of the individual grooves is adapted here in such a way that a power density of light that enters the lens plate 22 through the first lens structure 24 corresponds to the specified transmission function.

In this way, it is ensured that when light is extracted in the measurement region 34, an intensity change received at the light receiving unit 20 is only dependent on the total area on which the light rays are extracted in the measurement region 34.

The transmission function here may depend on a plurality of parameters of the sensor device 10. The parameters may include one or more of the following variables: Distance between the light source 18 and the light receiving unit 20 (measured in the transverse direction T), thickness of the lens plate 22 (measured in the axial direction A), thickness of the pane 16 (measured in the axial direction A), thickness of the coupling structure 14 (measured in the axial direction A), refractive index of the lens plate 22, refractive index of the coupling structure 14, refractive index of the pane 16, and/or acceptance angle range of the light extraction structure 26.

Optionally, the first lens structure 24 may be provided, at least in sections, with anti-transmission features. More particularly, the anti-transmission features are configured to prevent the light rays 32 coming from the light source 18 from entering the lens plate 22 or at least to attenuate the light intensity. The anti-transmission features are formed, for example, by an absorbent coating of the first lens structure 24. In embodiments, the anti-transmission features are arranged such that a central maximum intensity in the measurement region 34 is attenuated.

In particular, individual grooves of the first lens structure 24 are provided with the anti-transmission features.

The method steps described above may, of course, also be applied to lens structures that do not constitute a Fresnel lens but have a different shape suitable for the optical assembly 12.

The invention claimed is:

1. An optical assembly for an optical sensor device of a motor vehicle, comprising:
a lens plate;
a light source; and
a light receiving unit,
wherein the lens plate includes a lens structure on a side associated with the light source and a light extraction structure on a side facing away from the light source, the lens structure having different local radii of curvature, and
wherein the different local radii of curvature are selected such that light exiting through the light extraction structure is, at least in a measurement region associated with the optical assembly, distributed such that when light rays are coupled out in the measurement region, an intensity change received at the light receiving unit is only dependent on a total area on which the light rays are extracted in the measurement region.

2. The optical assembly of claim 1 wherein the lens structure constitutes a Fresnel lens.

3. The optical assembly of claim 1 wherein a local radius of curvature of the lens structure is described in sections by a linear function or by a non-linear function.

4. The optical assembly of claim 3 wherein the function is monotonic.

5. The optical assembly of claim 3, wherein the lens structure constitutes a Fresnel lens, and wherein at least one groove of the Fresnel lens is described by the function.

6. The optical assembly of claim 5 wherein a plurality of grooves of the Fresnel lens are each described by the same function or by different functions.

7. The optical assembly of claim 1 wherein the light source is arranged in a focal point of the lens structure.

8. The optical assembly of claim 1 wherein the lens structure has anti-transmission features in some regions.

9. The optical assembly of claim 8, wherein the lens structure constitutes a Fresnel lens, and wherein individual grooves of the Fresnel lens are provided with anti-transmission features.

10. A method of manufacturing an optical assembly that includes a lens plate, a light source, and a light receiving unit, wherein the lens plate includes a lens structure on a side associated with the light source and a light extraction structure on a side facing away from the light source, comprising the steps of:
specifying a focal length and a transmission function of the lens structure; and
determining a curvature function that describes the local curvature of the lens structure;
wherein the curvature function is such that a power density of light coming from a focal point of the lens structure and passing through the lens structure corresponds to the specified transmission function, and
wherein the transmission function is such that light exiting through the light extraction structure is, at least in a measurement region associated with the optical assembly, distributed such that when light rays are coupled out in the measurement region, an intensity change received at the light receiving unit is only dependent on a total area on which the light rays are extracted in the measurement region.

\* \* \* \* \*